Figure 3:
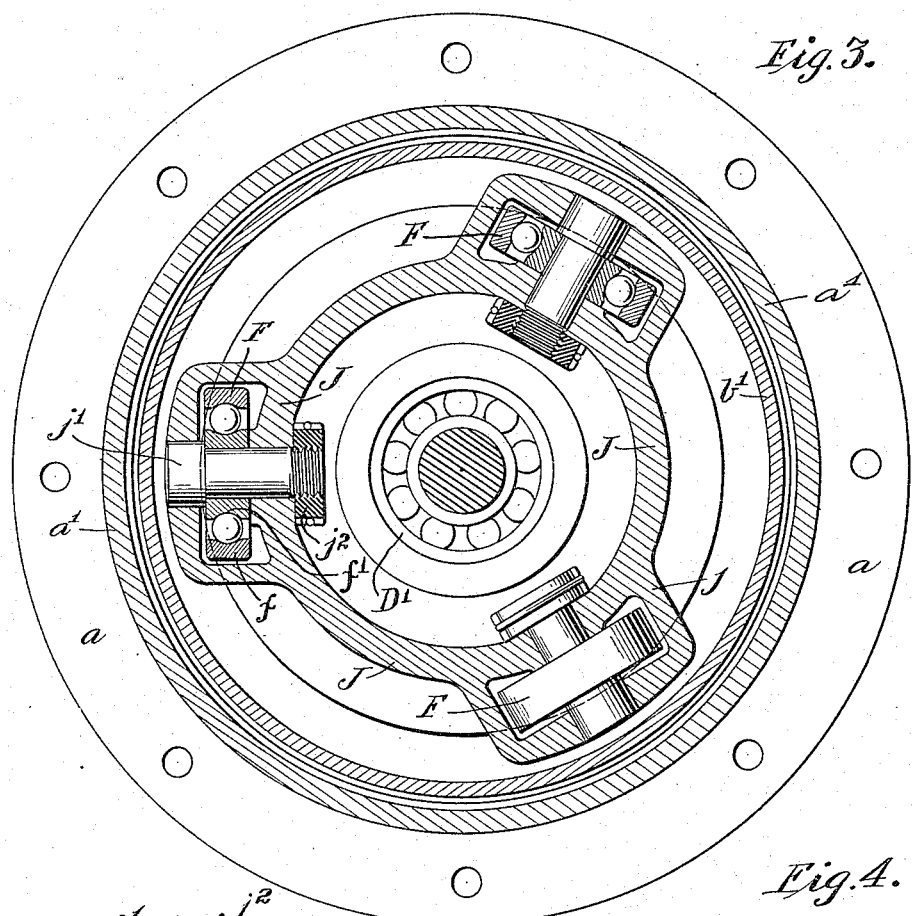

H. HESS.
VEHICLE FIFTH WHEEL.
APPLICATION FILED DEC. 9, 1911.
1,169,152.
Patented Jan. 25, 1916.
2 SHEETS—SHEET 1.
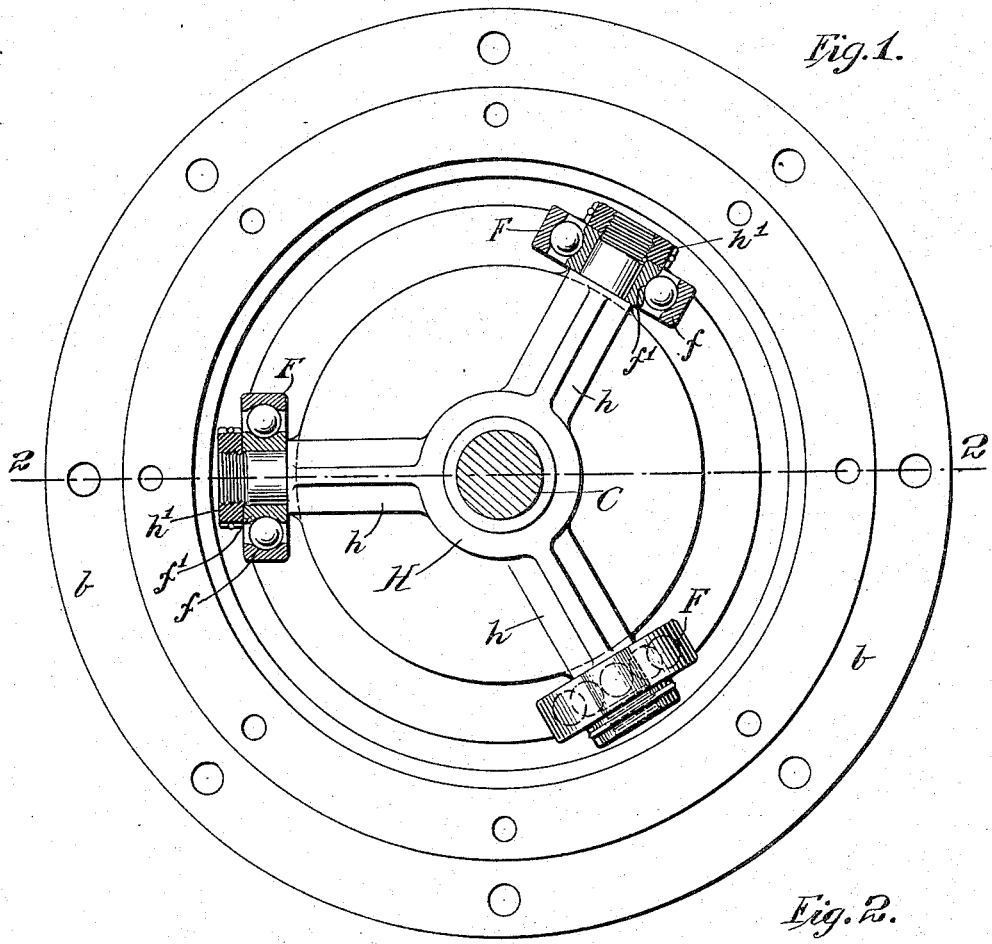
Fig. 1.
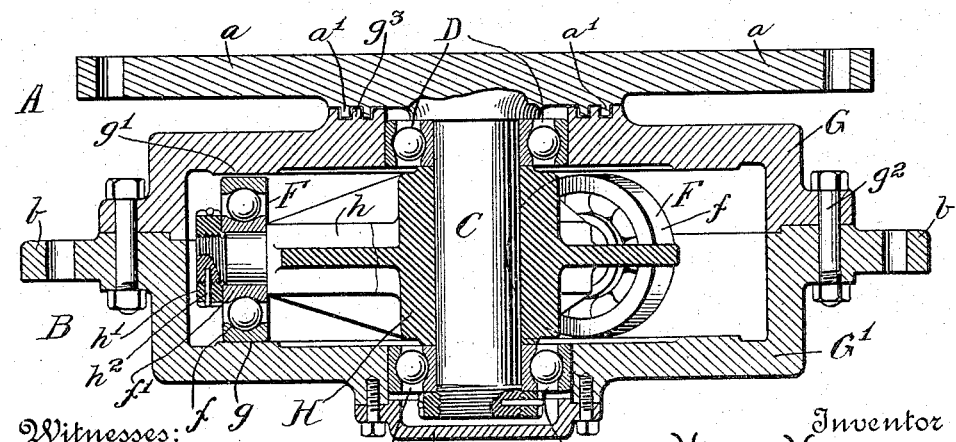
Fig. 2.

H. HESS.
VEHICLE FIFTH WHEEL.
APPLICATION FILED DEC. 9, 1911.

1,169,152.

Patented Jan. 25, 1916.
2 SHEETS—SHEET 2.

Witnesses:
R. B. Richardson.
E. B. King.

Inventor
Henry Hess,
By his Attorneys,
Rogers, Kennedy & Campbell.

THE COLUMBIA PLANOGRAPH CO., WASHINGTON, D. C.

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

VEHICLE FIFTH-WHEEL.

1,169,152.   Specification of Letters Patent.   Patented Jan. 25, 1916.

Application filed December 9, 1911. Serial No. 664,707.

*To all whom it may concern:*

Be it known that I, HENRY HESS, a citizen of the United States, residing at Philadelphia, in the county of Philadelphia and State of Pennsylvania, have invented certain new and useful Improvements in Vehicle Fifth-Wheels, of which the following is a specification, reference being had therein to the accompanying drawing.

My invention relates to improvements in fifth-wheels for vehicles, the fifth-wheel being that part of the vehicle which is interposed between the vehicle body above and the truck or axle below, to permit the latter and the pair of wheels carried by it to be revolved or swung. The ordinary wagon fifth-wheel consists of a pair of engaging disks, circles or members, the upper disk attached to the wagon body, the lower one to the wheel axle, the two being lubricated and there being a central pin or stud known as the king pin, serving to attach the whole together and maintain the parts in proper relation.

An object of the present invention is to afford a superior construction of fifth-wheel and particularly one which permits all sliding contact and all sliding friction to be replaced by rolling contact and rolling friction.

Subsidiary objects of the present improvements are to afford a housing which may be rendered closed or tight to exclude water and dirt and to prevent the escape of lubricant; also to afford a device wherein only rolling friction occurs, which device will be of a design that will be operative and efficient at diameters suitable for vehicle fifth-wheels, that is to say, diameters which are fairly large but considerably smaller than the width of the vehicle itself; also to avoid the objection of a device which if constructed on wrong principles would be too flexible for practical use as a fifth-wheel; for example, bearings designed for turn tables would be unavailable owing to this objection; also to avoid the deleterious effect and injury which would result from existing inaccuracies in the form of the parts or a change of shape thereof due to wear; also to avoid the objections of loose balls or rolling elements held in place only peripherally by the opposing contact of the upper and lower disks; also to afford a structure not expensive to manufacture but easy of action and durable.

The fifth-wheel among mechanical instrumentalities stands somewhat alone in its utilities and functions and in the requirements of design, construction and other conditions resulting therefrom. The desiderata above set forth are all important for an entirely satisfactory fifth-wheel, and in addition the limits above and below which the device's diameter may not pass, impose and compel certain requirements as to the proportions and design of the component parts.

I will now describe a device designed and proportioned to serve as a vehicle fifth-wheel and affording in the one device all of the above referred to desiderata.

The present invention consists in the novel features of design, of construction, combination of parts and arrangements as hereinafter set forth, described and illustrated.

I will first describe embodiments of my invention, and will then point out the novel features in the claims.

Figure 4:
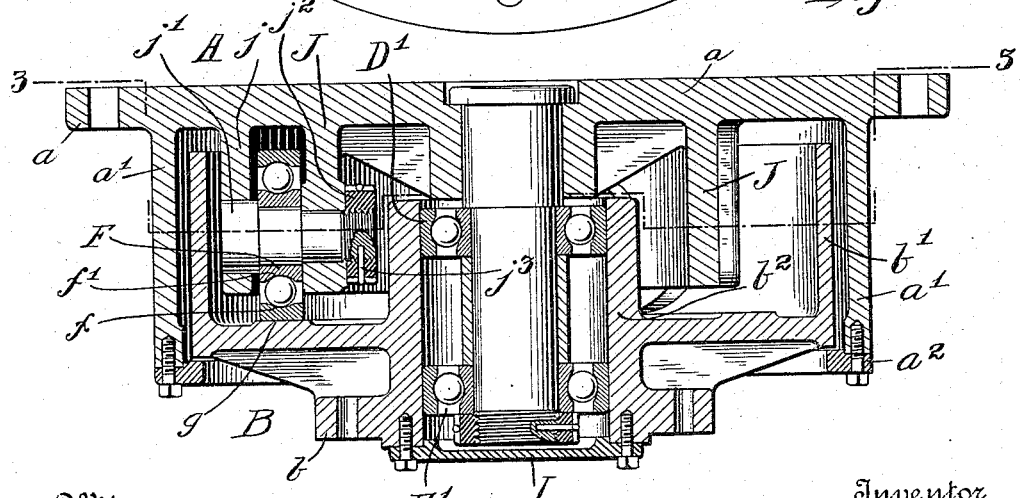

In the accompanying drawings forming a part hereof, Figure 1 represents an interior top view of the parts of one form of fifth-wheel embodying my invention, and may be said to be a top view of the parts shown in Fig. 2 omitting the parts D, *a*, G, which may be considered as removed. Fig. 2 is a central cross-section of the same taken on the plane 2—2 of Fig. 1. Fig. 3 is a view similar to Fig. 1 of a modified embodiment of the improvements; and Fig. 4 is a view similar to Fig. 2 illustrating the same embodiment as that disclosed in Fig. 3.

Similar letters of reference designate corresponding parts in the several figures of the drawings.

In every embodiment of the present invention, there will be the two, namely the upper and lower, disks or circles, or members as it will be more appropriate to term them as they will be seen to consist of more than mere disks or circles; the upper member A adapted to be attached to a wagon body, and the lower member B to the truck or axle. For such attachment each member may have any suitable means such as the attaching disks $a$ and $b$ respectively, each of which is shown suitably perforated at its periphery for the reception of bolts or the like.

In each embodiment of my invention in addition to the two members A and B referred to, there will be the following features, and in a broad sense the present invention may be said to consist of the combination of all of the features designated by reference letter in this paragraph, it being borne in mind, however, that since a device of this kind is susceptible of inversion, the designation of a feature as pertaining to one of the members A or B, must be taken to indicate the possible reversal in that respect. Secured to, or preferably comprised with and constituting a part of one of the members, namely the upper member A, is a vertical stud C projecting centrally into the interior of the other member B. To permit engagement between the stud C and the member B without involving sliding friction, one or more annular roller bearings D, E, arranged horizontally and concentric with the stud, are interposed between the stud C and member B. This alone would be insufficient and peripheral bearing points must be provided between the members A and B, to which end a series of three or more substantially vertical roller wheels F, F, F are employed, located at a substantial distance from the stud C and each wheel having an axle portion and a rim portion, one connected to or contacting with the member A, and the other with the member B for affording rolling contact and friction between the peripheries of said two members. Each of the several vertical roller wheels may be said to have rim contact with one of the members A and B and axial support from the other. The combination thus set forth is one permitting all of the conditions hereinabove recited, which may be carried out by the further details illustrated in the drawings and hereinafter described as follows:

In order to fully carry out the idea of avoiding sliding contact and friction, my preferred embodiment of the present invention contemplates that each of the roller wheels F shall in and of itself consist of an annular roller bearing whose outer race $f$ rolls for example upon a flat annular track $g$, formed in the member B, while the inner race $f'$ performs the function of a hub or axle and has support from, by being secured in rigid relation to, the member A. The manner of connecting the inner race $f'$ with the member A may be varied, as will be hereinafter described more in detail. Ordinary types of rolling elements such as balls will be inserted between the inner and outer races $f$, $f'$, in any well known manner.

In each embodiment of my invention the member B will preferably be constructed in the form of a casing separable or unseparable, having sufficient vertical dimension to encompass and protect the several rolling elements or bearings, and it is also preferred that the interior be made proof against the entrance of water, dirt and the like, and against the leakage of lubricants therefrom.

It will be understood that the wheels F, F, F acting as rollers receive the thrust caused by the weight of the wagon body or compression otherwise produced between the members A and B, while the bearings D, E constitute radial bearings holding the members in proper concentric relations and thereby assuming the brunt of the draft or forward pull upon the vehicle truck or axle with respect to the body.

In each embodiment of my invention it is preferred that the construction shall be locked against relative separation, which may be done by means of flanges or other well known expedients.

The above description states generally the construction of a fifth-wheel embodying my invention, and it applies equally to both of the modifications illustrated in the drawings hereof. I will now describe the further details of the embodiment shown in Figs. 1 and 2, and will thereafter similarly describe the details of Figs. 3 and 4.

A convenient means of supporting the roller wheels F, F, F upon the upper member A of the fifth-wheel so as to permit the rims of said wheels to roll upon the tracks $g$, is as follows: I prefer to provide the member A with a plurality of relatively fixed supporting devices whereby the wheels F, F, F are held in spaced apart position, and this may be effected by securing rigidly upon the stud C a web or spider device H, having a plurality of radially projecting arms $h$, each of which extends outwardly to substantially the periphery of the members A, B, and there has connected to it the hub or axle $f'$ of one of the wheels F. The end of the projection $h$ may be turned around to fit the similarly turned interior of the hub or axle $f'$, and a nut $h'$ may be employed to lock the parts together as shown, a pin $h^2$ serving to lock the nut $h'$ against rotation. By the described arrangement the three wheels F, F, F are held spaced apart around the track $g$ so that said wheels located between the members A and B, near their peripheries are adapted to receive any thrust or compression between the members.

I will now describe a feature which serves several functions, namely to effect an interlocking between members A and B so as to prevent their vertical separation, to tightly inclose and protect the bearings and wheels, and further to afford for the wheels F a track not only below but above, so that each wheel may act on either track according to any relative inclination between the members A, B, thus increasing the effectiveness of the improvement. Before describing this feature it should be made clear that the fifth-wheel member A in the sense hereof, includes not only the disk $a$ having means for attaching it to the wagon body and the stud C extending downwardly from said disk, but also the device H with its webs or arms $h$; all of which are rigidly secured together into what is in effect a single mechanical member. The parts which may move in a horizontal arc relatively to the member A together constitute the member B in the sense hereof.

The member B is shown as comprising substantially a complete housing made up of parts G, G′, which are preferably detachably connected by bolts $g^2$ or the like to enable the assemblage of the entire mechanism. The lower part G′ of the member B contains or has formed on it the annular track $g$ already mentioned. The upper part G is seen to have formed upon it a similar track $g'$ opposed to the track $g$ and located directly above the path of the wheels F, F, F. As shown there is a slight clearance between the wheels and the upper track $g'$, since the wheels must not touch both tracks at once, although sometimes when an inclined strain is imposed one or more of the wheels might run upon the upper track instead of the lower. This also would occur if the wagon body were lifted and the wagon axle or truck allowed to hang by its weight, thus depressing the member B relatively to member A. By this arrangement, an interlocking of members A, B is effected, for the engagement of wheels F, F, F, with track $g'$ precludes motion of either away from the other. This arrangement also has the result that inclined forces may lift one or more of the wheels from the lower to the upper track, which latter affords resisting contact so that with three wheels substantially six contacting points of resistance are afforded. The arrangement described also enables the member B to be constructed in the form of a housing entirely inclosing the wheels F, F, F and bearings D, E, thus keeping the parts clean and preventing leakage of lubricants. This result is effected by the design of the parts G, G′ of the member B, they affording two circular horizontal walls and a circular vertical wall connecting them. To more completely protect the interior a central cap I may be attached across the bottom of member B, thus inclosing the lower end of the stud C; and at the upper side of member B a dust and oil-proof connection or packing may be employed, located, for example, between the part G below and the disk $a$ above. I prefer to employ at this point a labyrinth packing produced by ribs $a'$, $g^3$ alternately depending from disk $a$ and projecting upwardly from part G, each rib engaging the between-rib grooves of the other and the entire labyrinth being filled with a fairly consistent grease before the parts are assembled.

The above described fifth-wheel effectively answers the objects and purposes of the present invention, and it is seen to afford a compact, self-contained, smooth running mechanism, well protected in every way and affording such full and easy play as is desirable for a mechanism of this class.

I will now describe the embodiment of the present invention which is illustrated in Figs. 3 and 4. In this embodiment the member B is seen to have an attaching flange $b$ for attaching it to a vehicle truck or axle, and also the vertical outer wall $b'$ giving the member sufficient vertical dimension to substantially inclose the wheels F, F, F. The member also has the inner wall $b^2$ which forms a base upon which its other parts are formed or secured; and the wall $b^2$ is shown as of sufficient vertical dimension to permit two spaced apart horizontally arranged radial bearings D′, E′ to be interposed between it and stud C. The bearings D′, E′ correspond to bearings D, E in Figs. 1 and 2, and are roller bearings, for example of the type having rolling balls between inner and outer races.

The three roller wheels F, F, F may be supported upon the upper member A of the fifth-wheel so as to permit the rims $f$ of said wheels to roll upon the tracks $g$ of member B, as follows: Depending from the member A and forming part of it, is an annular flange J. At three or more preferably equidistant points, depending upon the number of wheels F, F, F that are employed, wheel housings $j$ are provided or formed as part of the member A, and preferably integral with the member A and the annular flange J thereof. Each of the wheel housings $j$ consists of a vertical wall located outwardly of the flange J, said wall $j$ and said flange together inclosing a four-sided chamber within which a wheel F is located. Apertures may be formed in J and $j$ for the reception of wheel axle $j'$, which as shown may be formed with steps, thus affording shoulders, and with a securing nut $j^2$ locked into place by a pin $j^3$.

In order to render the entire mechanism tight against the entry of dirt and exit of lubricants, I prefer to provide the member A with a depending flange $a'$ located outwardly of the vertical flange or wall $b'$ of member B, and at its lower end provided with a rim or ring $a^2$ overlapping the member B and thus aiding to exclude dirt as well as to keep the mechanism interlocked against vertical separation of the members A, B.

It will be seen that by reason of the construction above shown and described a vehicle fifth-wheel is provided which answers the objects and affords the advantages of the invention as hereinbefore set forth, and other advantages will be apparent to those skilled in the art.

What I claim and desire to secure by Letters Patent is:

1. A vehicle fifth-wheel comprising in combination the upper and lower members adapted to be connected to the vehicle body and axle respectively, said lower member having a hollow construction closed beneath, said upper member having rigid with it a central stud projecting downwardly into the lower member, an upper and a lower horizontal radial bearing interposed between said stud and said lower member, and three or more spaced-apart vertical roller wheels within and near the periphery of said lower member, having rim contact with only the hollow lower member and having their hubs supported by rigid connection to the upper member.

2. A vehicle fifth-wheel comprising in combination two coöperating members adapted to be connected to the vehicle body and axle respectively, one of said members having an annular peripheral flange constituting of it a hollow housing, the second member having rigid with it a central stud projecting vertically into the hollow of the first member, an upper and a lower horizontal radial bearing located in the hollow of the first member and interposed between said stud and said first member, and three or more spaced-apart vertical roller wheels located in the hollow of said first member, having rim contact with the first only of said members and having their hubs supported by rigid connection to the other member.

3. A vehicle fifth-wheel comprising in combination two coöperating members, the first of said members having a hollow construction, the second member having rigid with it a central stud projecting vertically into the first member, an upper and a lower horizontal radial bearing interposed between said stud and said first member, and three or more spaced-apart vertical roller wheels between and near the peripheries of said members, having rim contact with one only of said members and having their hubs supported by rigid connection to the other member, the said first member formed with internal tracks both above and below said wheels, spaced apart slightly more than the wheels' diameters.

4. A vehicle fifth-wheel comprising in combination two coöperating members, the first of said members having a hollow construction, the second member having rigid with it a central stud projecting vertically into the first member, an axially elongated bearing device interposed between said stud and said first member, and three or more spaced-apart vertical roller wheels within and near the peripheries of said hollow first member, having rim contact with one only of said members and having their hubs supported by rigid connection to the other member, and the parts so constructed as to afford a housing inclosing said wheels both above and below and protecting the same.

5. A vehicle fifth-wheel comprising in combination two coöperating members, the first of said members having a hollow construction, the second member having rigid with it a central stud projecting vertically into the first member, an axially elongated bearing device interposed between said stud and said first member, and three or more spaced-apart vertical roller wheels between and near the peripheries of said members, having rim contact with one only of said members and having their hubs supported by rigid connection to the other member, the said first member formed with internal tracks both above and below said wheels, spaced apart slightly more than the wheels' diameters.

In testimony whereof I affix my signature in presence of two witnesses.

HENRY HESS.

Witnesses:
C. S. BUTLER,
B. KENNEDY.